(12) United States Patent
Upton

(10) Patent No.: US 6,470,023 B1
(45) Date of Patent: Oct. 22, 2002

(54) OPTICAL FIBER POSITION CONTROLLER FOR MULTIPLE DEGREES OF FREEDOM

(75) Inventor: Eric Lawrence Upton, Bellevue, WA (US)

(73) Assignee: Terabeam Corporation, Kirkland, WA (US)

( * ) Notice: Subject to any disclaimer, the term of this patent is extended or adjusted under 35 U.S.C. 154(b) by 119 days.

(21) Appl. No.: 09/799,851

(22) Filed: Mar. 5, 2001

(51) Int. Cl.[7] .............................................. H04B 7/216

(52) U.S. Cl. ...................... 370/441; 370/209; 370/516; 359/155

(58) Field of Search ............................... 370/203, 208, 370/209, 320, 325, 326, 335, 342, 441, 485, 516, 479, 480, 503, 507; 359/155, 154

(56) References Cited

U.S. PATENT DOCUMENTS 4,884,015 A * 11/1989 Sugimoto et al.
5,307,210 A * 4/1994 MacFarlane et al.
6,307,868 B1 * 10/2001 Rakib et al.

* cited by examiner

Primary Examiner—William Luther
(74) Attorney, Agent, or Firm—Blakely, Sokoloff, Taylor & Zafman, LLP (57) ABSTRACT

A multiple channel optical fiber controller provides an optical fiber positioning control loop for each degree of freedom. Each channel represents a degree of freedom and remains independent from other channels by modulating the degrees of freedom with an orthogonal code set. The orthogonal code set is an orthogonal CDMA code set so that the optical coefficients can be distinguished from each other and degrees of freedom can be independently match filter detected. Amplitude modulation allows the state of degrees of freedom to be derived and provides the necessary feedback signal for the degree of freedom channel.

19 Claims, 5 Drawing Sheets

OPTICAL FIBER POSITION CONTROLLER FOR MULTIPLE DEGREES OF FREEDOM

BACKGROUND OF THE INVENTION

1. Field of the Invention

The present invention is related to optical communication systems and, in particular, to positioning optical fibers within optical communication systems.

2. Background of the Invention

The primary function of an optical communication system is to transmit an optical signal from an optical transmitter to an optical receiver with minimal distortion of the optical signal. The optical transmitter converts an electrical signal into optical form and launches the resulting optical signal into an optical fiber. The optical fiber emits the optical signal into free space. An optical detector detects the optical signal in free space and couples the optical signal to the optical receiver.

For optimal communication of the optical signal from transmitter to receiver, optical fibers (or optical signals) on the transmit end must be aligned with detectors on the receive end. Because optical terminals that house transmitters and receivers are typically located in architectural structures (buildings, poles, etc.), which sway under the effect of wind, rain, sleet, snow, etc., or vibrate under the effect of human, mechanical, or natural phenomena, the optical fibers may become misaligned. Slight movement of the optical fiber, on the order of microradians (e.g., a microradian is an angular rotation of one part in 6.28 millions of a full circle) may be sufficient to cause misalignment. To minimize the chances of interrupted communications, the optical fiber must be rapidly and accurately realigned.

There are devices available today for positioning optical fibers, but they have limitations. For example, one type of device uses staged position controllers. These devices are expensive, slow, and only provide horizontal and vertical control.

Another type of device is a dither controller with lock-in amplifiers. These devices tend to be cascaded and time-shared using time division multiple access (TDMA) approaches. Time-shared/cascaded techniques tend to be cumbersome and tedious when attempting to implement horizontal and vertical control, and horizontal and vertical control cannot be performed simultaneously.

SUMMARY OF THE INVENTION

The present invention is directed to an optical fiber positioner to position an optical fiber in several degrees of freedom. The optical fiber positioner includes a digital controller to code digital degree of freedom value signals using a unique orthogonal code for each degree of freedom, a digital-to-analog converter bank coupled to the digital controller to convert coded digital degree of freedom value signals to coded analog degree of freedom value signals, an actuator coupled to the digital-to-analog converter bank to move an optical fiber based on the coded analog degree of freedom value signals. In operation, an optical fiber emits an optical signal having the coded analog degree of freedom value signals into free space. The optical fiber positioner includes an optical detector to detect the optical signal from free space and to recover coded analog error signals based on the coded analog degree of freedom value signals, and an analog-to-digital converter coupled to the optical detector to convert the modulated analog error signals to modulated digital error signals. The digital controller is coupled to the analog-to-digital converter to detect coded digital error signals using the unique orthogonal code.

BRIEF DESCRIPTION OF THE DRAWINGS

The invention is best understood by reference to the figures wherein references with like reference numbers generally indicate identical, functionally similar, and/or structurally similar elements. The drawing in which an element first appears is indicated by the leftmost digit(s) in the reference number in which.

DETAILED DESCRIPTION OF THE ILLUSTRATED EMBODIMENTS

Figure 1:
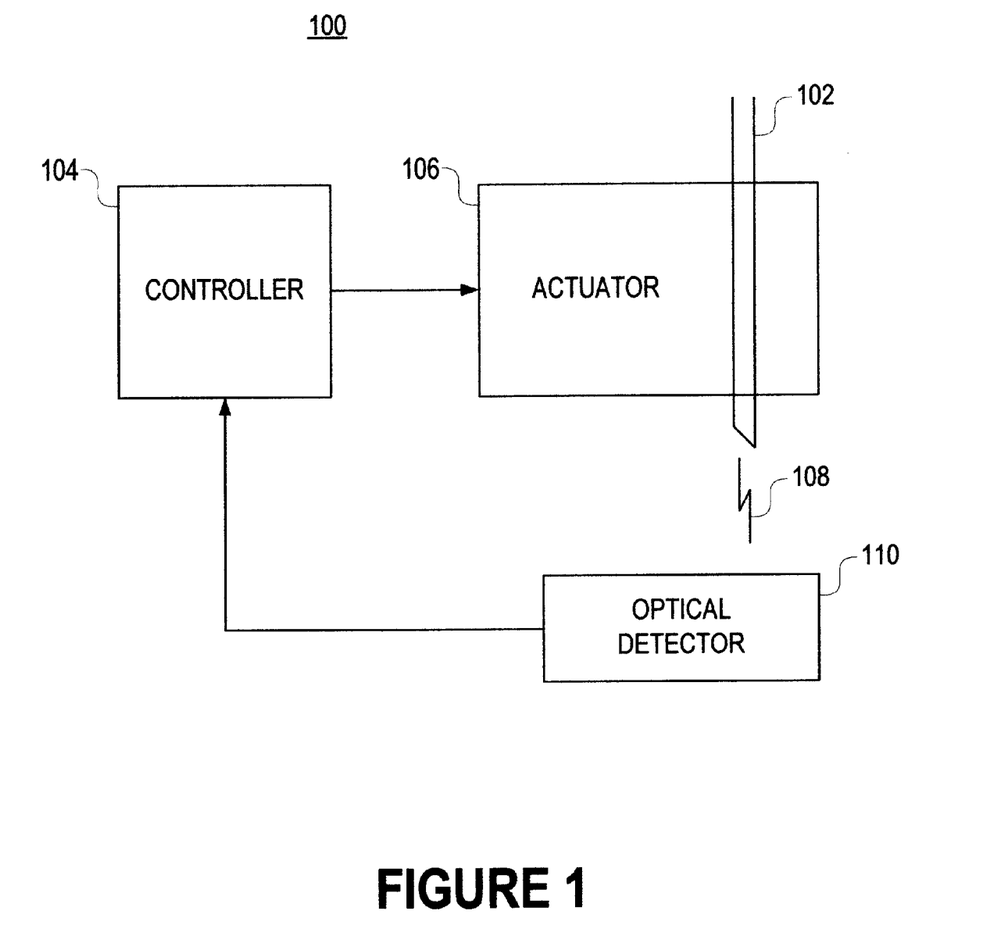
FIG. 1 is a high-level block diagram of an optical fiber positioning device 100 for use in an optical communication system.

FIG. 1 is a high-level block diagram of an embodiment of an optical fiber positioning device 100 for use in an optical communication system. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as modulator, amplifier, light beam, actuator, gain, mixer, and so forth. These terms are commonly employed by those skilled in the art to convey the substance of their work to others skilled in the art.

Other parts of the description will be presented in terms of operations performed by a computer system, using terms such as receiving, detecting, collecting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The optical fiber positioning device 100 provides loop control for each of degree of freedom in which an optical fiber 102 moves. In one embodiment, there are five degrees of freedom of concern. There are three linear degrees of freedom (along the "x" axis, along the "y" axis, and along the "z" axis) and two rotational degrees of freedom (about the "x" axis and about the "y" axis). Rotation about the "x" axis is sometimes referred to as "azimuth" or "yaw." Rotation about the "y" axis is sometimes referred to as "elevation" or "pitch." In an alternative embodiment, there are six degrees of freedom of concern, including rotation about the "z" axis or "roll."

The optical fiber positioning device 100 has several channels. Each channel is associated with a degree of freedom. Each degree of freedom is associated with one or more magnetic positioning coils (or solenoids). In a general aspect, a controller 104 provides closed loop control of an actuator 106. The actuator 106 positions the optical fiber 102 using the coils, which produce magnetic fields when a current is applied to them. By varying the magnetic fields surrounding the coils, the direction of movement of the optical fiber 102 can be controlled.

Each degree of freedom has a value signal corresponding to a position of the optical fiber 102 in the particular degree of freedom. The value signals change as the fiber moves. The controller 104 modulates (or codes) (approximately) orthogonal codes on top of existing degree of freedom value signals. The controller 104 sums the modulated degree of freedom value signals to generate a composite signal 108. Modulating the degree of freedom value signals with (approximately) orthogonal codes maintains the independence of the degree of freedom value signals within the composite signal 108.

The optical fiber 102 emits a light beam into free space. The light beam includes the composite signal 108. An optical detector 110 detects the composite signal 108 and provides the detected composite signal 108 to the controller 104. The controller 104 demodulates the composite signal 108 using each degree of freedom's unique code. Demodulation separates out each degrees of freedom value signal to generate an error signal for each degree of freedom such that the optical fiber 102 can be repositioned accordingly. The optical fiber positioning system 100 thereby simultaneously controls all degrees of freedom.

The controller 104 modulates the degree of freedom value signals with unique (approximately) orthogonal code such that the amplitude of the (approximately) orthogonal code modulation is less than the degree of freedom value signal. The (approximately) orthogonal code modulations are attenuated in amplitude such that the (approximately) orthogonal code modulations are transparent to the degree of freedom value signals of interest. The code's length enables each degree of freedom feedback signal to be independently recovered from the composite signal 108.

Figure 2:
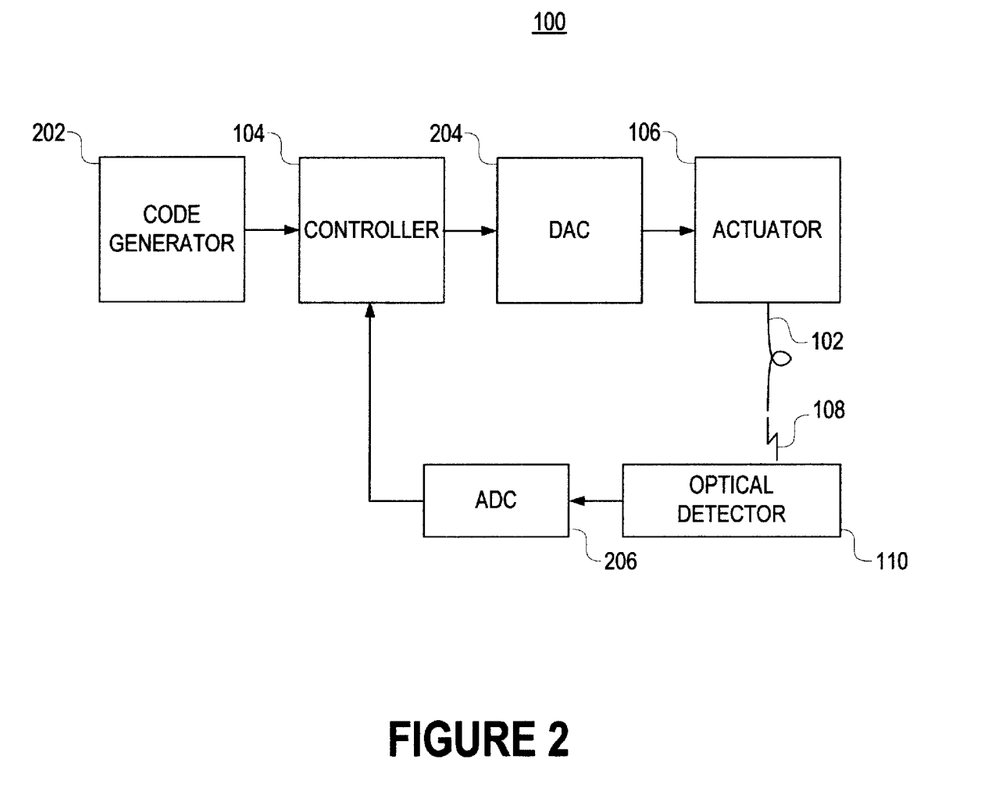
FIG. 2 is a more detailed view of the optical fiber positioning device 100.

FIG. 2 is a more detailed view of an embodiment of the optical fiber positioning device 100, in which a code generator 202 generates codes for the controller 104 to modulate degree of freedom value signals in the digital domain. A digital-to-analog converter (DAC) 204 (which also may be a bank of individual digital-to-analog converters) converts the degree of freedom value signals from the digital domain to the analog domain and provides the degree of freedom value signals to the actuator 106. The actuator 106 uses the degree of freedom value signals to position the optical fiber 102. The optical fiber 102 repositions accordingly.

The composite signal 108 is coupled to the optical detector 110 via free space. The optical detector 110 sends the composite signal 108 to an analog-to-digital converter (ADC) 206. The ADC 206 converts the composite signal 108 from analog to digital and provides the digital composite signal to the controller 104 for demodulation. The controller 104 demodulates the composite signal 108 and sends new degree of freedom value signals to the actuator 106 via the DAC 204.

Although FIG. 2 depicts the code generator 202 and the DAC 204 as separate from the controller 104, the code generator 202 and the DAC 204 may be integrated into the controller 104.

Figure 3:
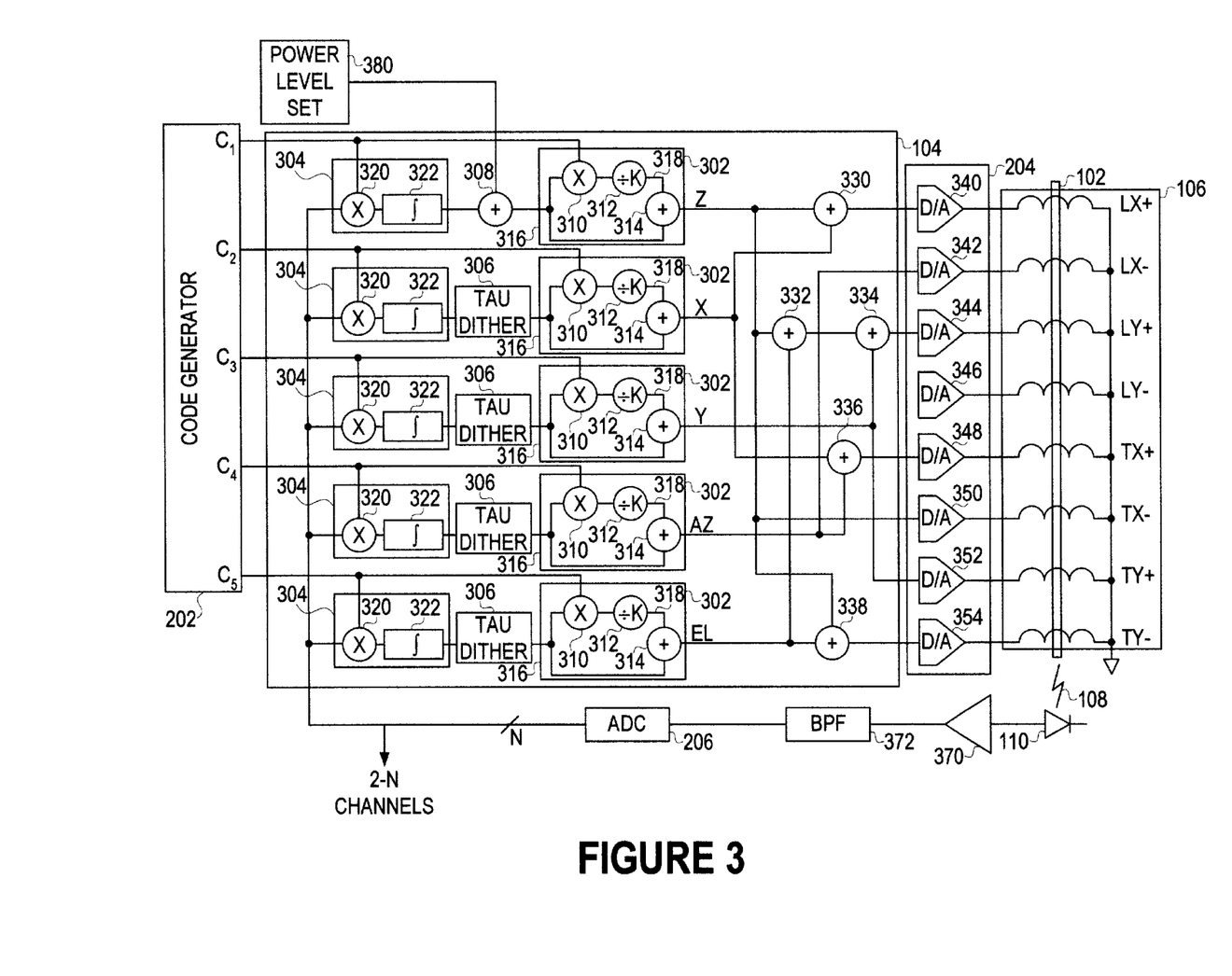
FIG. 3 shows an embodiment in which the controller 104 has five channels ("z," "x," "y," "azimuth," and "elevation")

FIG. 3 shows an embodiment in which the controller 104 has five channels ("z," "x," "y," "azimuth," and "elevation"). The code generator 202 generates a code $C_1$ for the "z" channel, a code $C_2$ for the "x" channel, a code $C_3$ for the "y" channel, a code $C_4$ for the "azimuth" channel, and a code $C_5$ for the "elevation" channel.

The codes $C_1$, $C_2$, $C_3$, $C_4$, and $C_5$ are (approximately) orthogonal codes such as (approximately) orthogonal code division multiple access (CDMA) codes. The code sequences have zero or near-zero cross-correlation, such as well-known Walsh codes or well-known Gold codes. Code sequences that have zero cross-correlation are orthogonal codes. Code sequences that have near-zero cross-correlation are approximately orthogonal codes. Correlation using (approximately) orthogonal coded modulation ensures that the cross-correlation between individual codes in a set of codes is "zero" and the autocorrelation of an individual code to itself is "one or unity" such that only the designated channel responds to information in the composite signal 108 designated for that particular channel.

Each channel has a modulator 302 and a demodulator 304. The embodiment shown in FIG. 3 depicts each channel except the "z" channel as having a tau-dither 306 and depicts the "z" channel as having a summer 308 between the demodulator 304 and the modulator 302. However, the "z" channel also may have a tau-dither 306 between the demodulator 304 and the modulator 302. Any one channel may have a summer 308 in place of the tau-dither 306.

The modulator 302 modulates (or codes) degree of freedom value signals 316. Each modulator 302 includes a scalar 312, a mixer 310, and a summer 314. The scalar 312 attenuates the (approximately) orthogonal codes by a constant "K", which represents the relationship/ratio between the amplitude of the code and the amplitude of the value signal from the coils during the selected interval. In one embodiment, K=10, such that superimposing the codes on the degree of freedom value signals minimally (ten percent) affects the positional information in the composite signal 108.

The mixer 310 multiplies the scaled degree of freedom value signals with the codes. The summer 314 adds the multiplied, scaled degree of freedom value signals and codes 318 with degree of freedom value signals 316 to generate (approximately) orthogonal coded degree of freedom value signals for each channel.

The coded degree of freedom value signals for each channel are coupled to one or more of signal flow control devices 330, 332, 334, 336, and 338. Each flow control device 330, 332, 334, 336, and 338 is coupled to one or more digital-to-analog D/A converters, such as D/A converters 340, 342, 344, 346, 348, 350, 352, and 354. The D/A converters convert each digital coded degree of freedom value signal to an analog coded degree of freedom value signal.

In an embodiment, the actuator 106 has eight coils, including four leading coils ("LX+," "LX-," "LY+," and "LY-") and four trailing coils ("TX+," "TX-," "TY+," and "TY-"). The coils LX+, LY+, TX+, and TY+ are positive coils, based on a Cartesian coordinate system, for example, and the LX-, LY-, TX-, and TY- are negative coils. The D/A converters 340, 342, 344, 346, 348, 350, 352, and 354 drive the coils LX+, LX-, LY+, LY-, TX+, TX-, TY+, and TY-, respectively.

Recall that in one embodiment, there are five degrees of freedom and eight coils, and the degrees of freedom are resolved to a particular coil(s). This means that to move the optical fiber along the "z" axis does not utilize eight solutions, but only two solutions associated with the two sets of coils, either the leading set of "x" and "y" coils or the trailing set of "x" and "y" coils.

Thus, the control loop for positioning the optical fiber 102 along the "z" axis includes the signal flow control devices 330, 332, 334, and 338, the D/A converters 340, 344, 350, and 354, and the coils LX+, LY+, TX+, and TY-. The signal flow control devices 330, 332, 334, and 338 ensure that degree of freedom signal values for positioning the optical fiber 102 along the "z" axis are applied only to the D/A converters 340, 344, 350, and 354. The equation solution for moving the optical fiber 102 along the "z" axis is $$F_Z = C\{(I_{LX}+I_{LY})-(I_{TX}+I_{TY})\},$$

where $F_Z$ represents positional force in the "z" direction, C is a constant, $I_{LX}$ represents the current through the leading "x" coil, $I_{TX}$ represents the current through the trailing "x" coil, $I_{LY}$ represents the current through the leading "y" coil, and $I_{TY}$ represents the current through the trailing "y" coil. When current is increased in the leading coils (LX+, LY+, LX-, and LY-) relative to the trailing coils (TX+, TY+, TX-, and TY-) the optical fiber 102 moves away from the target. When current is increased in the trailing coils (TX+, TY+, TX-, and TY-) relative the leading coils (LX+, LY+, LX-, and LY-) the optical fiber 102 moves towards the target.

Two solutions are used to move the optical fiber 102 along the "x" axis, i.e., associated with the leading "x" coil and the trailing "x" coil. The control loop for positioning the optical fiber 102 along the "x" axis includes the signal flow control devices 330 and 336, the D/A converters 340 and 348, and the coils LX+ and TX+. The signal flow control devices 330 and 336 ensure that degree of freedom signal values for positioning the optical fiber 102 along the "x" axis are applied only to the D/A converters 340 and 348. The equation associated with moving the optical fiber 102 along the "x" axis is $$F_X = C(I_{LX}+I_{TX}),$$

where $F_X$ represents positional force in the "x" direction, C is a constant, $I_{LX}$ represents the current through the leading "x" coil, and $I_{TX}$ represents the current through the trailing "x" coil. The optical fiber 102 moves horizontally along the "x" axis when the current is increased in the leading coil LX+ and the trailing coil TX+ or increased in the leading coil LX- and the trailing coil TX-, where the direction (left or right) depends on whether the coils are positive or negative.

Two solutions are used to move the optical fiber 102 along the "y" axis, i.e., associated with the leading "y" coil and the trailing "y" coil. The control loop for positioning the optical fiber 102 along the "y" axis includes the signal flow control device 334, the D/A converters 344 and 352, and the coils LY+ and TY+. The signal flow control device 334 ensures that degree of freedom signal values for positioning the optical fiber 102 along the "y" axis are applied only to the D/A converters 344 and 352. The equation associated with moving the optical fiber 102 along the "y" axis is $$F_Y = C(I_{LY}+I_{TY}),$$

where $F_Y$ represents positional force in the "y" direction, $I_{LY}$ represents the current through the leading "y" coil, and $I_{TY}$ represents the current through the trailing "y" coil. The optical fiber 102 moves vertically along the "y" axis when current is increased in the leading coil LY+ and the trailing coil TY+ or increased in the leading coil LY- and the trailing coil TY-, where the direction (up or down) depends on whether the coils are positive or negative.

Two solutions are used to rotate the optical fiber 102 about the "x" axis for "azimuth," i.e., associated with leading "x" coil and the trailing "x" coil. The control loop for rotating the optical fiber 102 about the "x" axis includes the signal flow control device 336, the D/A converters 342 and 348, and the coils LX- and TX+. The signal flow control device 336 ensures that degree of freedom signal values for rotating of the optical fiber 102 about the "x" axis are applied only to the D/A converters 342 and 348. The equation associated with moving the optical fiber 102 about the "x" axis is $$T_{AZ} = C(I_{LX}-I_{TX})$$

where $T_{AZ}$ represents positional torque in the "x" direction. The optical fiber 102 rotates about the "x" axis when the current is increased in the leading coils disproportionate to the increase in the trailing coils, and vice versa.

Two solutions are used to move the optical fiber 102 about the "y" axis for "elevation," i.e., associated with leading "y" coil and the trailing "y" coil. The control loop for rotating the optical fiber 102 about the "y" axis includes the signal flow control devices 332, 334, and 354, the D/A converters 344 and 354, and the coils TX- and LX+. The signal flow control devices 332, 334, and 354 ensure that degree of freedom signal values for rotating of the optical fiber 102 about the "y" axis are applied only to the D/A converters 344 and 354. The equation associated with moving the optical fiber 102 about the "x" axis is $$T_{EL} = C(I_{LY}-I_{TY}),$$

where $T_{EL}$ represents positional torque in the "y" direction. The optical fiber 102 rotates about the "y" axis when the current is increased in the leading coils disproportionate to the increase in the trailing coils, and vice versa.

Each coil in the actuator 104 affects the optical fiber 102 such that the optical fiber 102 emits a light beam that the composite signal 108 and comprises information from all eight coils. All eight coils are typically active at the same time because the optical fiber 102 usually is moving randomly in different directions, caused by vibrations or sway, for example.

The optical detector 110 detects (a significant portion of) the composite signal 108, converts the composite signal 108 from an optical signal to an electrical signal, and couples the composite electrical signal to an amplifier 370. The amplifier increases the signal strength of the composite signal 108. A band pass filter (BPF) 372 improves the closed loop transfer function of the positioning system and reduces any unwanted signals or harmonics from the amplified composite signal 108. The BPF 372 passes the filtered signal to an ADC 206. The ADC 206 brings the composite signal 108 into the digital domain from the analog domain and couples the digital signal onto N digital lines for N control loops, where N is greater than or equal to two. In the embodiment shown, N is equal to five.

The digital composite signal 108 is applied to each channel's control loop. In each channel's control loop, the digital composite signal 108 is applied to the demodulator 304, which demodulates (or decodes) the composite signal 108. Specifically, the demodulator 304 correlates the digital composite signal 108 with the corresponding (approximately) orthogonal CDMA code used to modulate the degree of freedom of interest. The correlation distinguishes each degree of freedom value signal within the digital composite signal 108 from each other. In particular, each code's length enables each control loop to independently recover the control loop's feedback signal from the aggregate of signals and codes through processing gain realized in each loop. To determine the status of each degree of freedom, each one of the codes can be filtered independently.

Each demodulator 304 includes a mixer 320 and an integrator 322. The mixer 320 multiplies the digital composite signal 108 with the code for the particular channel. A coded signal may be (m) chips in sequence length. Each Chip is an element or bit of the sequence. The integrator 322 integrates each chip of the particular code for each channel to provide the necessary processing gain to extract the state of the degree of freedom from the composite signal 108. The demodulator 304 generates a demodulated degree of freedom value signal representing a desired position for the optical fiber 102, and applies the demodulated degree of freedom value signal to the tau-dither 306.

The tau-dither 306 generates a signal representing a new desired position for optical fiber 102. As the optical fiber 102 moves, the tau-dither 306 searches for an optimum position for the optical fiber 102. The optimum position is typically the position that affords the better coupling of the composite signal 108 to the detector 106. Alternatively, the tau-dither 306 attempts to find any position of interest for the optical fiber 102. In alternative embodiments, a nutation module or a gradient searcher may be used rather than a tau-dither.

A power level set 380 provides a bias level to control the power level of the light emitted from the optical fiber 102. This is useful for selecting an optimum position that does not provide peak power level for the composite signal 108. In the embodiment shown, a summer 308 sums the bias level with the integrator 322 desired positioning information and allows the "z" degree of freedom (or any other degree of freedom) to track the bias level.

Figure 4:
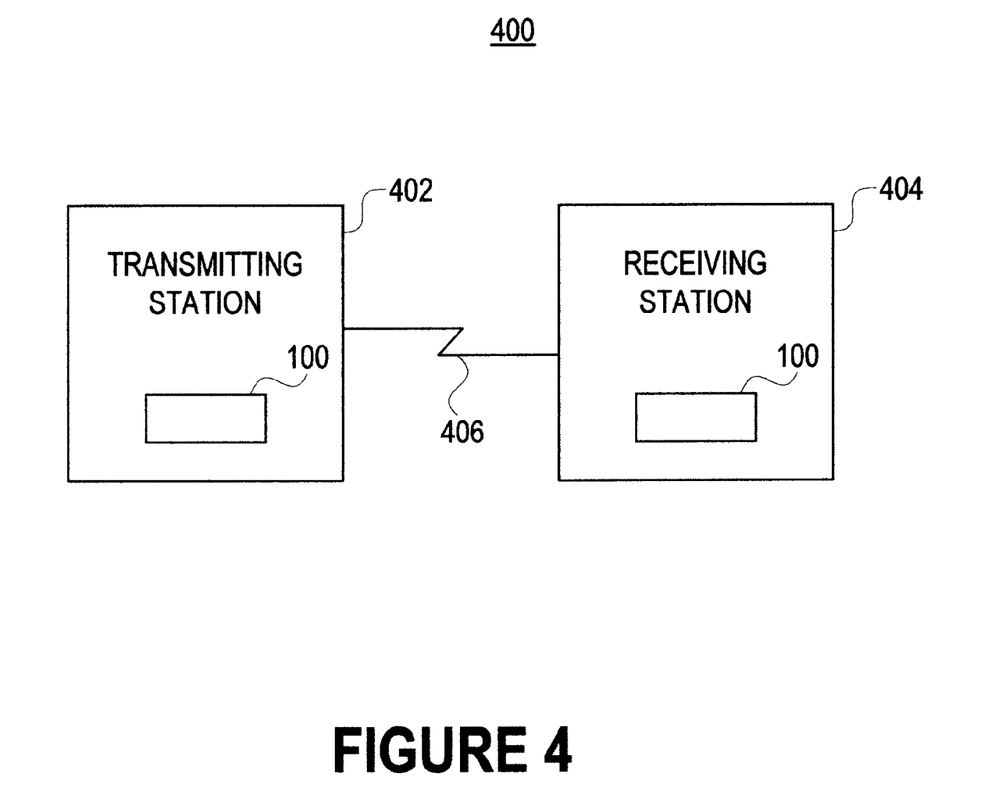
FIG. 4 is a high-level block diagram of an optical communications system according to aspects of the present invention.

FIG. 4 is a high-level block diagram of an optical communication system 400 which includes a transmitting station 402, a receiving station 404, a signal 406, and the optical fiber positioning device 100. The system 400 includes routers, switches, tuners, attenuators, focus controls, etc., each of which may include the device 100. Component aging in the system 400 causes optical fibers to come out of alignment. The optical fiber positioning device 100 has fewer parts to age. As a result, the cost of systems and/or devices embodying the optical fiber positioning device 100 is decreased as compared to conventional fiber positioning systems. Temperature drift also causes optical fibers to come out of alignment. The optical fiber positioning device 100 has reduced alignment sensitivity during manufacturing and over the life of the product variation.

Figure 5:
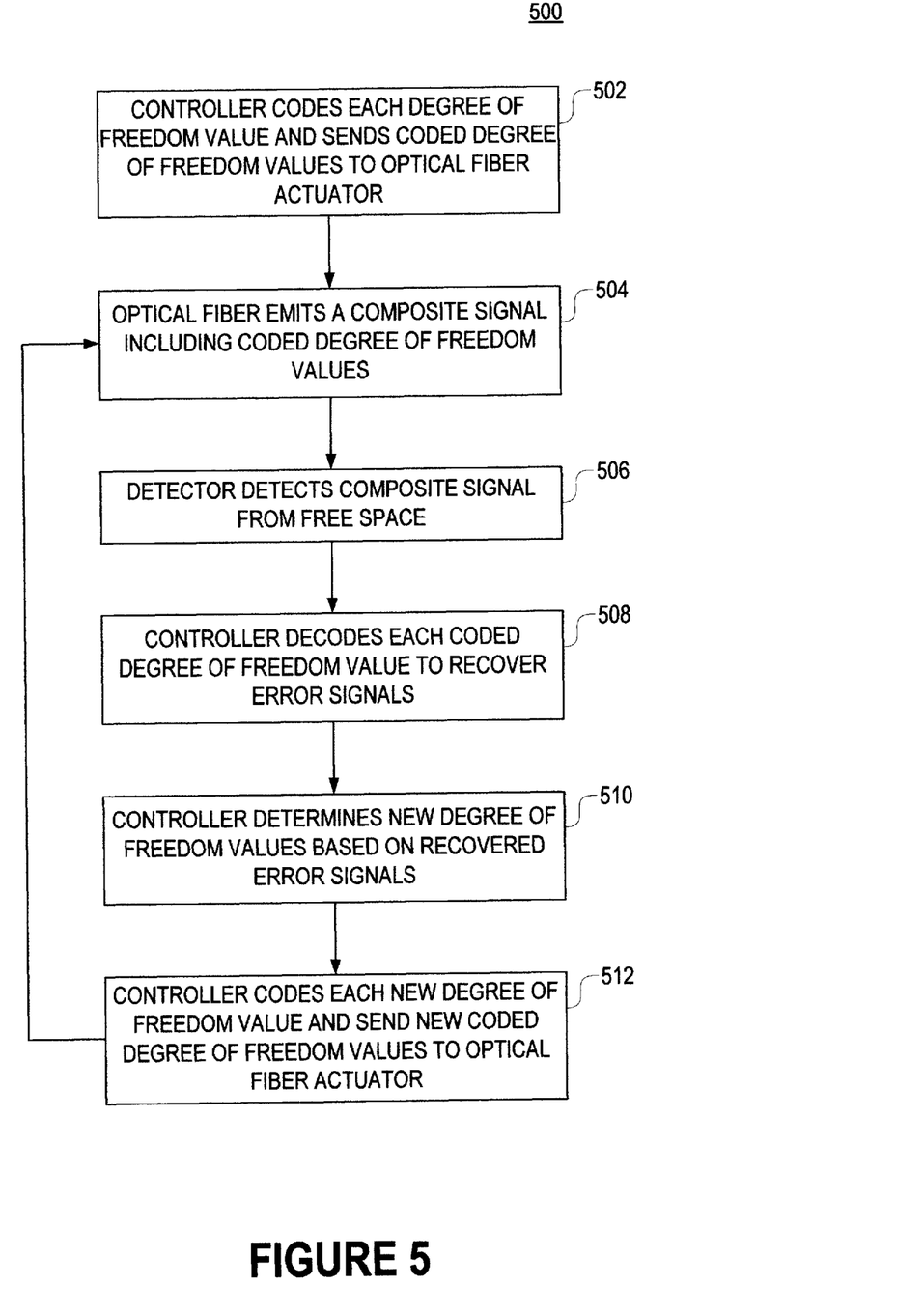
FIG. 5 illustrates an approach to positioning an optical fiber according to aspects of the present invention.

FIG. 5 is a flowchart 500 illustrating an approach to positioning an optical fiber in the system 400 for several degrees of freedom. In step 502, the controller 104 codes each degree of freedom value signal and sends the coded degree of freedom value signals to the actuator 106. The actuator 106 positions the optical fiber 102 accordingly.

In step 504, the optical fiber 102 emits the composite signal 108, which includes coded degree of freedom value signals for the new optical fiber 102 position.

In step 506, the optical detector 110 detects the composite signal 108 from free space. Other components in the system 400 such as an analog-to-digital converter or bandpass filter may condition the composite signal.

In step 508, the controller decodes each degree of freedom value signal to recover an error signal for each degree of freedom.

In step 510, the controller 104 determines new degree of freedom value signals based on the recovered error signals. The new degree of freedom value signals typically includes realignment information as well as information associated with the random movement of the optical fiber 102.

In step 512, the controller 104 codes the new degree of freedom value signals and sends the new degree of freedom value signals to the actuator 106. The actuator 106 repositions the optical fiber 102 accordingly. This approach is iterative and adaptive such that as the optical fiber 102 moves it is continually/continuously being moved to a desired position.

Although various embodiments are described with respect to eight coils, the present invention is not so limited. For example, in an embodiment, there are six coils. In another embodiment, there are five coils. Moreover, although various embodiments are described with respect to five degrees of freedom, in alternative embodiments, the device 100 positions the optical fiber 102 in more than five or less than five degrees of freedom. From the description provided herein, a person of ordinary skill in the art could readily implement the present invention for six coils or various degrees of freedom.

Aspects of the invention can be implemented using hardware, software, or a combination of hardware and software. Such implementations include state machines, a field programmable gate array (FPGA), a microprocessor, an application specific integrated circuit (ASIC), discrete medium scale integrated (MSI) circuits, analog circuitry, etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

What is claimed is:

1. An apparatus, comprising:
    a digital controller to modulate digital degree of freedom value signals using a unique orthogonal code for each degree of freedom;

first circuitry coupled to the digital controller to convert modulated digital degree of freedom value signals to modulated analog degree of freedom value signals;

an actuator coupled to the first circuitry to position an optical fiber in several degrees of freedom based on the modulated analog degree of freedom value signals, the optical fiber to emit an optical signal comprising the modulated analog degree of freedom value signals into free space;

an optical detector to detect the optical signal from free space and to recover modulated analog error signals based on the modulated analog degree of freedom value signals; and second circuitry coupled to the optical detector to convert the modulated analog error signals to modulated digital error signals, the digital controller further coupled to the second circuitry to demodulate modulated digital error signals using the unique orthogonal code.

2. The apparatus of claim 1, further comprising a code generator coupled to the digital controller to generate the unique orthogonal code for each degree of freedom, wherein the orthogonal codes are orthogonal code division multiple access (CDMA) codes, CDMA Gold codes, or CDMA Walsh codes.

3. The apparatus of claim 1, wherein the actuator comprises coils associated with each degree of freedom and wherein the degree of freedom signal values for a degree of freedom of interest are applied only to its associated coils.

4. The apparatus of claim 1, further comprising third circuitry coupled to the digital controller to control the power level of the optical signal.

5. The apparatus of claim 1, further comprising an amplifier coupled between the optical detector and the digital controller to amplify recovered modulated analog error signals.

6. The apparatus of claim 1, further comprising a filter coupled between the optical detector and the digital controller to filter unwanted signals from the recovered modulated analog error signals.

7. The apparatus of claim 1 wherein the digital controller includes a scalar to attenuate the orthogonal codes by a constant.

8. The apparatus of claim 1 wherein the orthogonal codes are approximately orthogonal.

9. The apparatus of claim 1 wherein the second circuitry further converts the modulated analog error signals to five channels of modulated digital error signals associated with five degrees of freedom.

10. A method, comprising:

coding digital degree of freedom value signals using a unique orthogonal code for each degree of freedom and converting the coded digital degree of freedom value signals to coded analog degree of freedom value signals;

positioning an optical fiber in several degrees of freedom based on the coded analog degree of freedom value signals, the optical fiber emitting the coded analog degree of freedom value signals as an optical signal into free space;

detecting the optical signal from free space and recovering coded analog error signals based on the coded analog degree of freedom value signals and converting the coded analog error signals to coded digital error signals; and decoding coded digital error signals using the unique orthogonal code.

11. The method of claim 10, further comprising repositioning the optical fiber using new coded degree of freedom value signals based on the decoded digital error signals.

12. The method of claim 10, further comprising coding the degree of freedom value signals with orthogonal code division multiple access (CDMA) codes, CDMA Gold codes, or CDMA Walsh codes.

13. The method of claim 10, further comprising applying coded degree of freedom value signals to optical fiber actuator coils associated with the degree of freedom of interest to position the optical fiber in the degree of freedom of interest.

14. The method of claim 10, further comprising amplifying the coded analog error signals or filtering out unwanted signals from the amplified coded analog error signals.

15. The method of claim 10, further comprising converting the modulated analog error signals to five channels of modulated digital error signals associated with five degrees of freedom.

16. An apparatus, comprising:

a controller having five channels each associated with a degree of freedom, the controller to code degree of freedom value signals using a unique orthogonal code for each degree of freedom;

an actuator coupled to the controller to move an optical fiber in five degrees of freedom based on the coded degree of freedom value signals, the optical fiber to emit an optical signal comprising the coded degree of freedom value signals into free space; and an optical detector to detect the optical signal from free space and to recover coded error signals based on the coded analog degree of freedom value signals, the digital controller further coupled to the optical detector to decode coded digital error signals using the unique orthogonal code.

17. The apparatus of claim 16, further comprising a code generator coupled to the controller to generate the unique orthogonal code for each degree of freedom, wherein the orthogonal codes are orthogonal code division multiple access (CDMA) codes, CDMA Gold codes, or CDMA Walsh codes.

18. The apparatus of claim 16 wherein the controller includes a scalar to attenuate the orthogonal codes.

19. The apparatus of claim 16, further comprising:

an amplifier coupled to the optical detector to amplify recovered coded error signals; and a filter coupled to the amplifier to filter unwanted signals from the amplified coded error signals.

* * * * *